United States Patent [19]

Koehnle

[11] Patent Number: 5,142,415
[45] Date of Patent: Aug. 25, 1992

[54] BACK-LIT DISPLAY

[75] Inventor: Gregory A. Koehnle, St. Paul, Minn.

[73] Assignee: Minnesota Mining and Manufacturing Company, Saint Paul, Minn.

[21] Appl. No.: 366,746

[22] Filed: Jun. 15, 1989

[51] Int. Cl.$^5$ ............... G02B 27/00; G01D 11/28; G09F 13/04

[52] U.S. Cl. ................... 359/601; 359/609; 359/614; 40/427; 40/541; 40/564; 40/593; 362/23; 362/29

[58] Field of Search ............ 350/321, 276 R, 276 SL, 350/284; 40/580, 615, 468, 541, 564, 581, 591, 593, 615, 421; 340/756, 763, 988; 362/23, 26, 29, 30, 31; 428/141, 195, 207; 359/601, 609, 614

[56] References Cited

U.S. PATENT DOCUMENTS

| Re. 27,617 | 4/1973 | Olsen | 161/6 |
|---|---|---|---|
| 1,651,429 | 12/1927 | Wineburgh | 40/580 |
| 1,786,155 | 12/1930 | Farrell | 40/580 |
| 2,689,422 | 9/1954 | Hoff | 40/580 |
| 3,197,903 | 8/1965 | Walley | 40/615 |
| 3,653,138 | 4/1972 | Cooper | 40/130 R |
| 3,707,416 | 12/1972 | Stevens | 156/196 |
| 3,786,412 | 1/1974 | Capriotti | 340/468 |
| 3,791,722 | 2/1974 | Ahlberg et al. | 351/45 |
| 3,878,631 | 4/1975 | Mileham | 40/137 |
| 3,919,559 | 11/1975 | Stevens | 250/508 |
| 3,922,440 | 11/1975 | Wegwerth et al. | 428/437 |
| 4,240,220 | 12/1980 | Smith | 40/615 |
| 4,688,156 | 8/1987 | Suzuki et al. | 362/29 |
| 4,764,410 | 8/1988 | Grzywinski | 428/120 |
| 4,772,096 | 9/1988 | Kai et al. | 359/601 |
| 4,788,094 | 11/1988 | Morita et al. | 350/370 |

FOREIGN PATENT DOCUMENTS

| 0064865 | 11/1982 | European Pat. Off. . |
| 2426789 | 12/1974 | Fed. Rep. of Germany . |
| 3634996 | 3/1988 | Fed. Rep. of Germany . |
| 2142180 | 1/1985 | United Kingdom . |
| 2173736A | 10/1986 | United Kingdom . |

OTHER PUBLICATIONS

European Search Report for corresponding European Patent Application No. 90306225.5 dated Dec. 9, 1991 (Minnesota Mining and Manufacturing Company).
Patent Abstracts of Japan, vol. 9, No. 158 (M-393)(1881), Jul. 3, 1985; and JP-A-60032695 (Toppan Insatsu K.K.) Feb. 19, 1985, Whole Abstract.

Primary Examiner—Rodney B. Bovernick
Assistant Examiner—R. D. Shafer
Attorney, Agent, or Firm—Gary L. Griswold; Walter N. Kirn; Stephen W. Buckingham

[57] ABSTRACT

A back-lit display having a window including a light-collimating film. The light-collimating film has an opaque material on a surface thereof. A material of a predetermined color is on the opaque material in registration therewith.

10 Claims, 2 Drawing Sheets

BACK-LIT DISPLAY

BACKGROUND OF THE INVENTION

A problem with lighted instrument panels in vehicles such as automobiles lies in the fact that light is emitted from such instrument panels through a wide range of angles. Some of this light will strike glass surfaces such as the windshield and be reflected back to the driver. While sunlight prevents such reflections from being visible during the day, they are often clearly visible during the night. Such reflections can create a dangerous situation by distracting the driver or even obscuring the driver's view.

One method of preventing such reflections is to use louvered plastic films in the window covering the instrument panel. The louvers partially collimate the light allowing the driver to read the instruments, but preventing the light from reaching the windshield to create reflections. Such films are often called "light-collimating films" although they actually only provide partial collimation. This can be a very effective system for controlling such reflections. A problem arises when there is printing on the film, however. Of the inks typically used for printing on such films, only black is truly opaque. Other colors will transmit some light. The light that is transmitted will be scattered, defeating the purpose of the collimating film. Thus a system for providing lettering on such louvered plastic films without scattering the light transmitted therethrough is desirable.

SUMMARY OF THE INVENTION

In the present invention a back-lit display has a window including a light-collimating film. The light-collimating film has an opaque material on a surface thereof. A material of a predetermined color is on the opaque material in registration therewith.

DETAILED DESCRIPTION OF THE PREFERRED EMBODIMENTS

Figure 1:
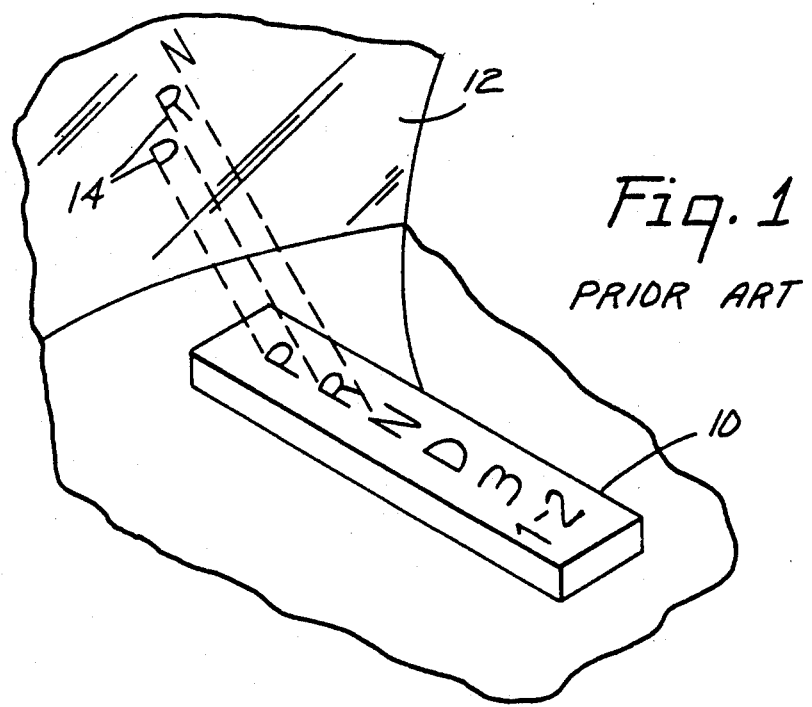
FIG. 1 shows a prior art back-lit display and undesirable reflections associated therewith.

FIG. 1 shows a back-lit instrument panel 10 of the prior art. Instrument panel 10 is of the type typically associated with a console mounted selector for an automatic transmission. The invention could, however, be used in conjunction with other types of back-lit displays. Some of the light from lighted instrument panel 10 strikes windshield 12 creating reflections 14. Reflections 14 can be annoying to a driver or even create dangerous situations.

Figure 2:
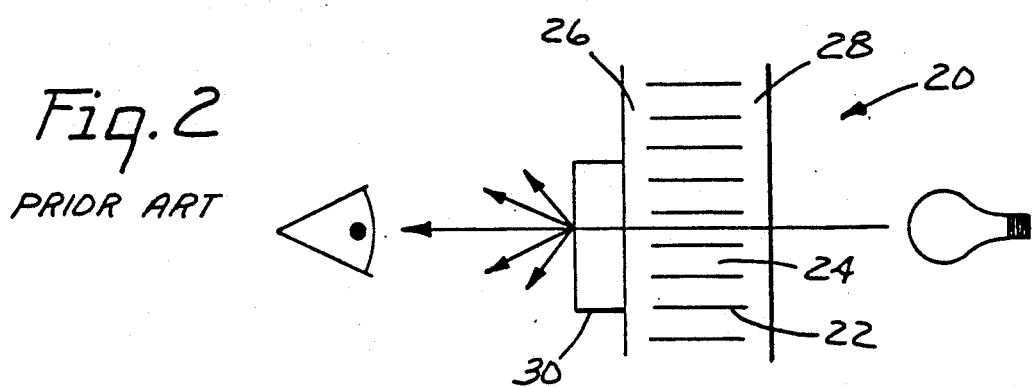
FIG. 2 shows a prior art display with a light-collimating film with printing thereon.

FIG. 2 shows a light-collimating film 20 that may be used as a window in the back-lit display to prevent light from reaching the windshield and causing reflections. Light-collimating film 20 includes a louvered plastic film having alternating opaque louvers, such as louver 22, and transparent regions, such as transparent region 24. Over the louvered plastic film are transparent cover sheets 26 and 28. The light-collimating film may be of the type described in U.S. Pat. Nos. 4,764,410, issued Aug. 16, 1988 or 4,766,023, issued Aug. 23, 1988, both of which are commonly assigned herewith.

A problem arises when lettering is to be placed on the light-collimating film. Such lettering could be of an opaque material. As stated previously, the principle inks available for printing on the light-collimating films are black. In some circumstances, printing in colors other than black is desired for aesthetic reasons. In addition, because of the black louvers in the light-collimating film, other colors such as white will provide greater contrast and thus easier readability during the day. If the lettering 30 is of a material that is not opaque, some of the light will pass through it. The light that passes through lettering 30 will be randomly scattered. Thus, even though the light was collimated by light-collimating film 20, it is again scattered by material 30. As a result, some of the light will still reach the windshield causing the undesirable reflections.

Figure 3:
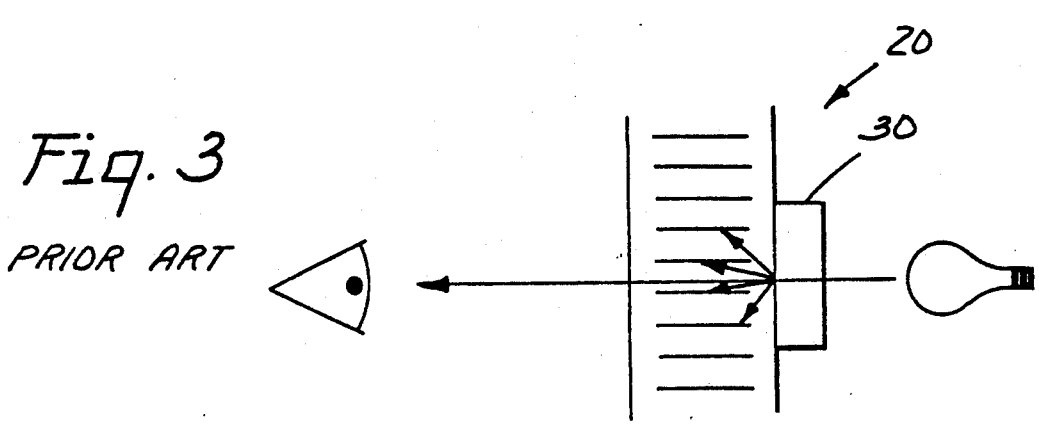
FIG. 3 shows a prior art display with a light-collimating film with printing on the side interior to the display.

FIG. 3 shows an alternative to the system of FIG. 2. In the system of FIG. 3, the printing 30' is positioned so that light will be collimated after passing through material 30' rather than before. The system of FIG. 3 will effectively prevent light from reaching the windshield, but in a less than satisfactory way. The system of FIG. 3 is unsatisfactory aesthetically because the colors will appear duller when obscured by the louvers in light-collimating film 20. Thus, white lettering, for example, will appear to be gray. Furthermore, the lettering is simply more difficult to read through the louvers.

Figure 4:
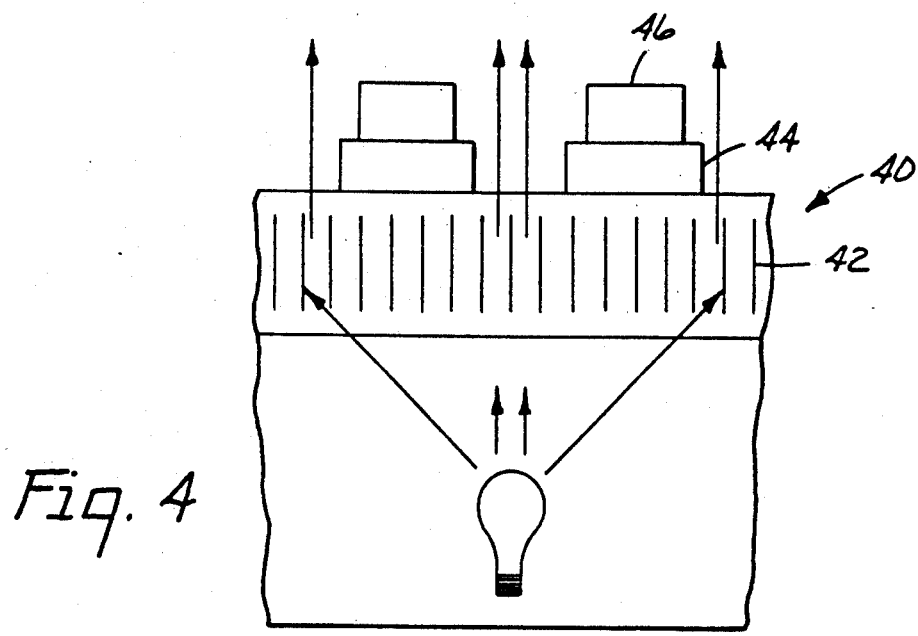
FIG. 4 shows a first embodiment of the invention.

FIG. 4 illustrates a display according to the invention. In the display of FIG. 4 a window includes a light-collimating film 40 having louvers 42 to provide the light collimation. Information provided on the light-collimating film includes two layers. The first layer is an opaque material 44 and the second layer is a material 46 having a desired predetermined color. Layer 46 is provided in registration with layer 44. As used herein the term registration will be understood to mean that layer 46 does not extend beyond the edge of layer 44 on any side.

Figure 5:
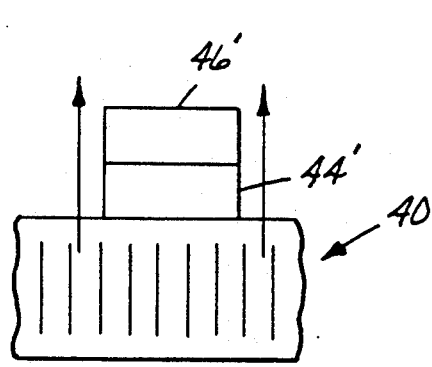
FIG. 5 shows a second embodiment of the invention.

FIG. 5 illustrates an embodiment of the invention where opaque material 44' is on light-collimating film 40 and a material 46' of a predetermined color is on opaque material 44'. Material 46' covers exactly the same amount of area as material 44, so that all of material 44' is covered.

Figure 6:
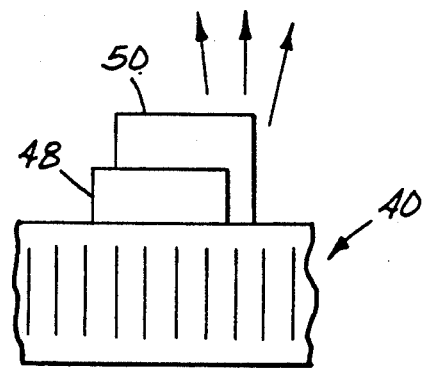
FIG. 6 shows a light-collimating film where the opaque material and the colored material are not in proper registration.

FIG. 6 illustrates the importance of correct registration of the colored material with respect to the opaque material. As may be seen from FIG. 6, colored material 50 is incorrectly registered with opaque material 48. As a result, some of the light passing through light-collimating film 40 passes through colored material 50 and is scattered as in the prior art. Thus, if the colored material is not in registration with the opaque material, as shown in FIG. 6, some of the light would be likely to reach the windshield and the undesirable reflections would result.

Figure 7:
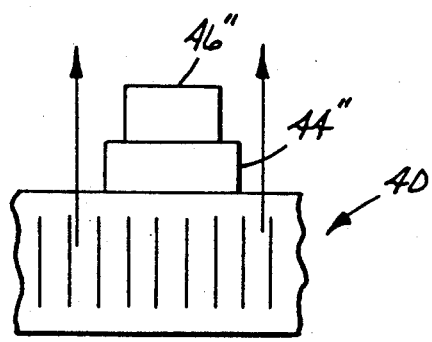
FIG. 7 shows a third embodiment of the invention.

Because of the difficulty of providing an opaque layer and a colored layer of exactly the same size, misregistration, as shown in FIG. 6, is likely if they are made the same size. FIG. 7 illustrates an embodiment of the invention in which colored layer 46″ is smaller than opaque layer 44″. The result is that it is easier to provide proper registration, because small registration errors will not create a defective product. The structure of FIG. 7 will then appear to the user to be lettering of the color of colored material 46″ bordered in the color of opaque material 44″, typically black.

Figure 8:
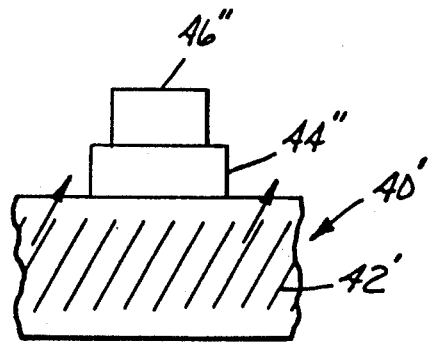
FIG. 8 shows an embodiment of the invention wherein the louvers of the light-collimating film are not perpendicular to the major surfaces of the film.

In the embodiments of FIGS. 4, 5, and 7 the light-collimating film has two major surfaces that are parallel to each other. The louvers are perpendicular to the major surfaces in those embodiments. FIG. 8 illustrates an embodiment of the invention in which the louvers, such as louver 42′ of light-collimating film 40′ are not perpendicular to the major surfaces of light-collimating film 40′. In the example shown, the louvers are at an angle of 60° with the major surfaces of the light-collimating film. This provides a particularly advantageous arrangement when the film is to be used in the instrument panel associated with the selector for an automatic transmission. With the louvers at an angle similar to this, the light is directed toward the driver, providing easier viewing, while at the same time being directed away from the windshield. Thus the driver's view of the panel is improved while the chance of unwanted reflections from the windshield is reduced.

What is claimed is:

1. A back-lit display comprising:
   light-collimating film;
   opaque material on said light-collimating film; and
   material of a predetermined color on said opaque material and in registration therewith.

2. The back-lit display of claim 1 wherein said light-collimating film includes a louvered plastic film.

3. The back-lit display of claim 2 wherein said light-collimating film has two major surfaces, said major surfaces being parallel to each other.

4. The back-lit display of claim 3 wherein said louvered plastic film has a plurality of louvers perpendicular to said major surfaces.

5. The back-lit display of claim 3 wherein said louvered plastic film has a plurality of louvers not perpendicular to said major surfaces.

6. A window for a back-lit display comprising:
   light-collimating film;
   opaque material on said light-collimating film; and
   material of a predetermined color on said opaque material and in registration therewith.

7. The window of claim 6 wherein said light-collimating film includes a louvered plastic film.

8. The window of claim 7 wherein said light-collimating film has two major surfaces, said major surfaces being parallel to each other.

9. The window of claim 8 wherein said louvered plastic film has a plurality of louvers perpendicular to said major surfaces.

10. The window of claim 8 wherein said louvered plastic film has a plurality of louvers not perpendicular to said major surfaces.

* * * * *